United States Patent
Mitte et al.

(10) Patent No.: US 8,401,227 B2
(45) Date of Patent: Mar. 19, 2013

(54) APPARATUS FOR ACQUIRING IMAGES OF MAILPIECES BEARING BOTH FLUORESCENT MARKS AND MARKS IN CONTRAST

(75) Inventors: Claude Mitte, Montigny les Cormeilles (FR); Celine Guignard, Issy les Moulineaux (FR)

(73) Assignee: Solystic, Gentilly Cedex (FR)

( * ) Notice: Subject to any disclaimer, the term of this patent is extended or adjusted under 35 U.S.C. 154(b) by 761 days.

(21) Appl. No.: 12/516,066

(22) PCT Filed: Jan. 26, 2009

(86) PCT No.: PCT/FR2009/050110
§ 371 (c)(1), (2), (4) Date: Oct. 1, 2009

(87) PCT Pub. No.: WO2009/095604
PCT Pub. Date: Aug. 6, 2009

(65) Prior Publication Data
US 2010/0054532 A1 Mar. 4, 2010

(30) Foreign Application Priority Data
Jan. 28, 2008 (FR) .................................... 08 50507

(51) Int. Cl.
*G06K 9/00* (2006.01)
(52) U.S. Cl. ...................................................... 382/101
(58) Field of Classification Search .................. None
See application file for complete search history.

(56) References Cited

U.S. PATENT DOCUMENTS

| | | | | |
|---|---|---|---|---|
| 5,272,407 A | * | 12/1993 | Tillman et al. | 313/25 |
| 5,534,709 A | | 7/1996 | Yoshimoto et al. | |
| 6,236,735 B1 | * | 5/2001 | Bjorner et al. | 382/101 |
| 8,131,019 B2 | * | 3/2012 | Miller et al. | 382/107 |
| 2008/0035866 A1 | * | 2/2008 | Goodwin et al. | 250/505.1 |
| 2008/0049972 A1 | * | 2/2008 | Blackwell et al. | 382/101 |
| 2010/0054532 A1 | * | 3/2010 | Mitte et al. | 382/101 |

FOREIGN PATENT DOCUMENTS

| | | |
|---|---|---|
| GB | 2 102 610 A | 2/1983 |
| WO | WO 2007/088290 A1 | 8/2007 |

* cited by examiner

*Primary Examiner* — Bhavesh Mehta
*Assistant Examiner* — Tahmina Ansari
(74) *Attorney, Agent, or Firm* — Rothwell, Figg Ernst & Manbeck, P.C.

(57) ABSTRACT

Image acquisition apparatus (1) for acquiring images of mailpieces (P), the apparatus comprising a housing (3) inside which the following are placed: a first camera (4) co-operating with a first lighting system (8) emitting light radiation at a certain wavelength suitable for exciting a fluorescent mark to acquire an image of the surface of a mailpiece through a first window (5); a second camera (6) co-operating with a second lighting system (9) emitting light radiation in the visible light domain to acquire an image of the surface of a mailpiece through a second window (7); and means (10) for preventing light interference, which means are concave in shape and are disposed between the first window and the second window, the second lighting system (9) being disposed in the cavity of said means (10) for preventing light interference.

8 Claims, 1 Drawing Sheet

FIG_1
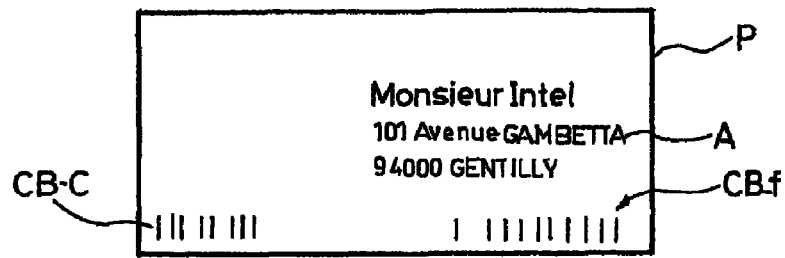
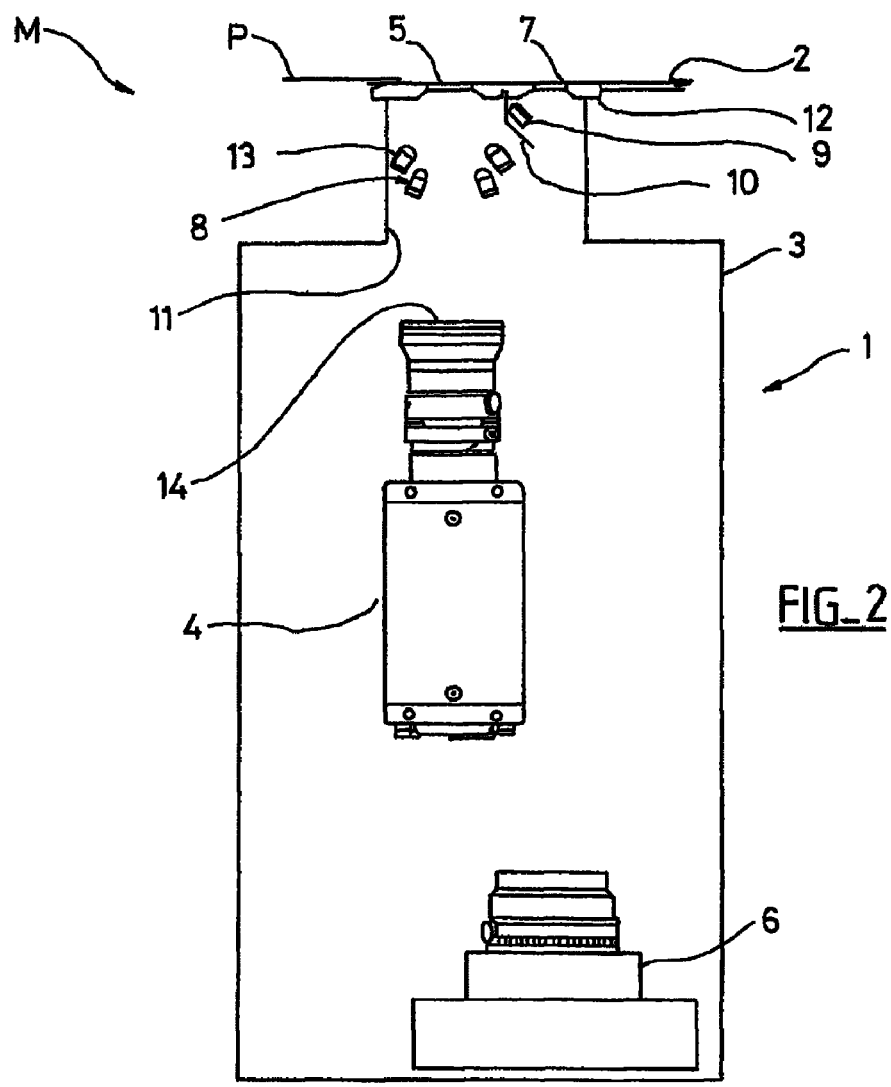
FIG_2
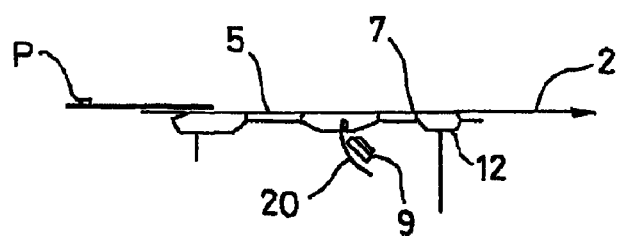
FIG_3

APPARATUS FOR ACQUIRING IMAGES OF MAILPIECES BEARING BOTH FLUORESCENT MARKS AND MARKS IN CONTRAST

The invention relates to apparatus for acquiring images of the surface of a mailpiece that bears fluorescent marks and/or marks in contrast. In particular the acquisition apparatus comprises a housing inside which the following are placed:
  a camera for acquiring an image of the surface of the mailpiece through a window formed in a wall of the housing;
  a first lighting system arranged to emit light radiation at a certain wavelength suitable for exciting the fluorescent mark;
  a second lighting system arranged to emit light radiation in the visible light domain; and
  means for preventing light interference between the first lighting system and the second lighting system.

The purpose of such apparatus is to acquire simultaneously both fluorescent marks or codes and also marks that are visible in contrast on the surface of a mailpiece. These two types of marking are generally used to identify the mailpieces in a machine and/or during a process for sorting said mailpieces. For example, the fluorescent mark is a fluorescent bar code that, once decoded, gives indications relating to the post code or "ZIP code". For example, the mark in visible contrast on the mailpiece is represented in the form of two-dimensional matrix codes or by characters in contrast that are indicative of the delivery address. The characters in contrast are generally decoded via an Optical Character Recognition (OCR) system. Alternatively, the fluorescent bar codes or the bar codes in contrast constitute a unique identification code for identifying the mailpiece that is generally represented by a bar code.

Therefore, mailpieces are increasingly being provided both with address data in visible contrast, and with a fluorescent bar code, the address data and the bar code being placed at different locations on the surface of the mailpiece.

The performance requirements relating to present-day sorting machines have led to a genuine need for the mailpieces to be identified and sorted automatically in the machine.

Document FR 2 895 820 discloses image acquisition apparatus as described above including two lighting systems for simultaneously acquiring images of a fluorescent mark and of a mark in contrast.

In addition, the acquisition apparatus disclosed in Document FR 2 895 820 further comprises, in a common housing, a camera and an opaque screen.

The first and the second lighting systems are placed one above the other facing a window past which the mailpieces are conveyed on edge. The camera is also disposed facing the window, so as to acquire an image of the surface of the current mailpiece as illuminated through the window.

Each of the lighting systems is arranged to emit in a different zone of the window. To this end, a plane screen is placed at the window so as to separate the two zones and so as to avoid light interference. Thus, the top portion of the surface of each mailpiece is illuminated with white light, and the bottom portion is illuminated with blue light.

The excited fluorescent ink presents the property of emitting light whose wavelength is different from the excitation wavelength. In addition, in Document FR 2 895 820, the first lighting system emits blue light having a wavelength of 470 nanometers (nm) for exciting a fluorescent ink on the surface of the mailpiece. In response to the incident excitation radiation, the light emitted by the excited fluorescent mark has a wavelength of about 600 nm, corresponding to the color orange.

The second lighting system emits white light. That light belongs to the visible domain whose wavelengths lie in the range 400 nm to 750 nm. That lighting system makes it possible to read address data appearing in contrast on the surfaces of the mailpieces.

Therefore, the acquisition apparatus of Document FR 2 895 820 is suitable for simultaneously acquiring images of a fluorescent mark situated in a bottom portion of the surface of the mailpiece and of a mark visible in contrast situated in the top portion.

With such a system, it is not possible to acquire images of fluorescent marks and of marks in contrast when the two types of mark are placed anywhere over the entire surface of the mailpiece. For example, if the bottom portion of the mailpiece includes marks in contrast, they are never read by the acquisition system of Document FR 2 895 820.

An object of the present invention is to remedy that drawback, by proposing unitary acquisition apparatus capable of reading both fluorescent marks and marks in contrast regardless of their positions on the surface of the mailpiece. An object of the invention is also to increase the acquisition performance of such apparatus while reducing its manufacturing and maintenance costs.

To this end, the invention provides image acquisition apparatus for acquiring images of mailpieces, the apparatus comprising a housing inside which the following are placed:
  a first camera for acquiring an image of the surface of a mailpiece through a first window formed in a wall of the housing;
  a first lighting system arranged to emit light radiation at a certain wavelength suitable for exciting a fluorescent mark;
  a second lighting system arranged to emit light radiation in the visible light domain; and
  means designed to prevent light interference between the first lighting system and the second lighting system;
wherein said image acquisition apparatus further comprises:
  a second camera placed inside the housing and for forming an image of the surface of a mailpiece through a second window formed in a wall of the housing, the first and second windows being spaced apart;
  said first camera co-operating with said first lighting system to acquire an image of the surface of a mailpiece through said first window, and said second camera co-operating with said second lighting system to acquire an image of the surface of a mailpiece through said second window, and wherein said means for preventing light interference are concave in shape and are disposed between the first window and the second window, the second lighting system being disposed in the cavity of said means for preventing light interference.

In a particular embodiment of the image acquisition apparatus of the invention, the means for preventing light interference are constituted by an opaque screen having a V-shaped section.

In another particular embodiment of the image acquisition apparatus of the invention, the means for preventing light interference are constituted by an opaque screen having a circularly arcuate shape.

Experience shows that illumination at a certain excitation wavelength, e.g. of blue color, is highly disturbed by illumination with visible light, e.g. of white color.

Reading fluorescent marks requires maximum contrast between the fluorescent mark and the background of the image constituted by the surface of the mailpiece. Reading thus depends on the level of the signal-to-noise ratio of the image. To this end, the apparatus of the invention is equipped with lighting for illumination at a precise wavelength that makes it possible to excite the fluorescent mark while limiting the excitation of the background of the surface of the mailpiece on which the mark is placed.

The difficulty solved by the invention lies in making it possible, inside a common housing, to place illumination with visible light close to illumination dedicated to fluorescence. Illumination with visible light or "white-light illumination" tends to disturb acquisition of an image of the fluorescent mark by exciting the background of the image, thereby giving rise to a fall in contrast and thus to a reduction in successful reading of the fluorescent mark.

Advantageously, the apparatus of the invention is equipped with a single lighting system for illumination with visible light that is disposed in the cavity of the opaque screen and that points away from the first lighting system, thereby considerably reducing the light interference. The performance of the acquisition system is thus improved.

Inside a common housing, each camera is thus associated with a different slot or window, and with a lighting system adapted to a specific mark. With the two dedicated lighting systems and with the concave screen, it is possible to acquire images of marks of different types, regardless of their positions on the surface of the mailpiece.

In addition, the single housing of standard size greatly facilitates installation and maintenance of said housing. Inserting it into a mailpiece conveyor path thus merely requires a single standard opening.

The image acquisition apparatus of the invention may have the following features:
- a band-pass optical filter is placed between said first camera and said first window;
- the first lighting system comprises light-emitting diodes (LEDs) disposed on either side of the first window; and
- the second lighting system is disposed on one side of the second window and comprises at least one LED.

The invention also provides a postal sorting machine including the image acquisition apparatus, in which machine the mailpieces are moved on edge past said acquisition apparatus in a certain conveying direction, and the first lighting system for illumination at a certain wavelength suitable for exciting a fluorescent mark is disposed upstream from the second lighting system for illumination with visible light in said conveying direction.

Thus, the first lighting system arranged to emit light radiation at a certain wavelength suitable for exciting a fluorescent mark does not cause any persistent reflection from the background of the surface of the mailpiece that reduces the image acquisition performance for a mark in contrast.

In the postal sorting machine of the invention, the first and second windows are spaced apart along the conveying axis, the first and second windows being of elongate shape and being substantially perpendicular to said conveying axis.

With such an arrangement, it can be understood that it is possible to acquire an image of the entire surface of the mailpiece in motion, and thus to read marks that are applied anywhere on the surface of the mailpiece.

The image acquisition apparatus is described in more detail below and is shown by the drawings. This description is given merely by way of indication and is in no way limiting on the invention. In the drawings:

FIG. 1 is a diagrammatic view of the surface of a mailpiece that bears address data in contrast, a fluorescent bar code, and a bar code in contrast;

FIG. 2 is a diagrammatic plan view of the acquisition apparatus of the invention; and FIG. 3 is a diagrammatic plan view of an alternative embodiment of the acquisition apparatus of the invention.

FIG. 1 shows a mailpiece P having a surface on which the following are placed: delivery address data A that appears in visible contrast, e.g. in black on a white background, a bar code 1 CB-f that is printed with fluorescent ink, and a bar code CB-c in visible contrast. In the FIG. 1 example, the fluorescent bar code CB-f is placed bottom right on the surface of the mailpiece P. The bar code in contrast is placed bottom left on the surface of the mailpiece. The fluorescent bar code CB-f generally serves for the automatic postal sorting process. For example, it is indicative of the post code of the address data A that has been previously extracted by using a conventional OCR method or a conventional video-coding method. The bar code CB-c in visible contrast is, for example, a unique identification code for identifying the mailpiece P.

The image acquisition apparatus 1 of the invention is shown in FIG. 2 with a mailpiece P that is being moved on edge in a sorting machine M in the direction indicated by arrow 2.

The acquisition apparatus 1 includes a housing or black box 3 that is opaque to light and that is of substantially rectangular shape.

In accordance with the invention, the housing contains:
- a first camera 4 for acquiring an image of the surface of a mailpiece through a first longitudinal slot or window 5 formed in a wall of the housing;
- a second camera 6 also arranged for acquiring an image of the surface of a mailpiece through a second longitudinal slot or window 7 formed in said wall of the housing;
- a first lighting system 8 arranged to emit light radiation at a certain wavelength suitable for exciting the fluorescent mark CD-f towards the first window 5;
- a second lighting system 9 arranged to emit light radiation in the visible light domain towards the second window 7; and
- an opaque screen 10 for preventing light interference between the first lighting system 8 and the second lighting system 9.

In particular, two shoulders are formed on a wall of the housing 3 so as to constitute an insertion portion or "nose" 11 for the acquisition apparatus. The nose 11 of the acquisition system 1 forms a narrow portion suitable for being inserted into the sorting machine. The elements that are voluminous, such as the cameras 4 and 6, are placed outside of the nose 11 so as to improve the compactness of the acquisition apparatus 1 along the conveying axis 2 at the insertion zone. Conversely, the two lighting systems 8 and 9 are relatively compact. They can therefore be housed in the nose of the acquisition apparatus.

A side wall of the nose is constituted by a skid 12 against which the surface of the mailpiece P comes into abutment and slides while the mailpiece is moving on edge. The mailpiece is thus pressed against the skid in order to avoid any reflection.

The skid 12 is provided with a first window 5 and with a second window 7, past which windows the mailpiece P is moved, the first window 5 being disposed upstream from the second window 7 in the conveying direction 2.

The two longitudinal windows 5 and 7 form windows that are spaced apart along the conveying axis. The first slot and the second slot are disposed substantially perpendicularly to said conveying axis 2 so as to span the entire height of the mailpiece being moved on edge. Advantageously, each camera associated with a window and with a corresponding lighting system can acquire an image of the entire surface of each mailpiece.

Each window 5 and 7 constitutes an opening between the housing and the outside. Preferably, said openings are closed by pieces of sapphire. The mailpiece is pressed against the sapphire in order to reduce reflection further. Closing the windows also makes it possible to protect the acquisition apparatus from dust and to prevent a portion of a mailpiece P from penetrating into the housing 3 and from thereby causing the sorting machine to jam.

In addition, a notch provided in the skid 12 is disposed inside the housing 3 between the first and second windows for the purpose of fastening the concave screen 10. The notch also makes it possible to optimize the mutual isolation of the two lighting systems. The screen 10 has a V-shaped section. As explained below, this opaque screen of concave shape makes it possible to reduce significantly the light interference between the two lighting systems and thus to house inside a common housing two different lighting systems operating in optimum manner with two cameras.

The lighting system 8 is placed upstream from the lighting system 9 in the direction indicated by arrow 2. For example, said lighting system 8 is made up of two strips of LEDs 13 that are disposed in two rows perpendicular to the axis 2 on either side of the first window 5. Each strip can be made up of a plurality of vertical rows of LEDs. The LEDs have the particular feature of being highly directional. They are thus fully adapted to concentrating the light radiation towards the first window 5.

Conventionally, a lighting system 8 is chosen that emits blue light having a wavelength of 470 nm for exciting a fluorescent ink on the surface of the mailpiece. In response to the incident excitation radiation, the light emitted by the excited fluorescent mark has a wavelength of about 600 nm, corresponding to the color orange.

Preferably, the LEDs 13 present a small angle of incidence lying in the range 15° to 45° relative to the optical axis of the camera 4. The LEDs are placed at a maximum distance of 35 millimeters (mm) from the object plane. In an embodiment with more than two strips of LEDs, it is possible to place said strips of LEDs in staggered manner so as to improve the physical compactness of the fluorescent lighting system. For example, one strip of LEDs is inclined by 20° relative to the optical axis of the camera, and is situated about 32 mm from the object plane, while the second strip forms an angle of 33° relative to the optical axis of the camera, and is disposed at a distance of 26 mm from the object plane.

This arrangement of the lighting system 8 makes it possible to generate, in the object plane, illumination that is sufficiently powerful to excite the fluorescence while also being highly directive. This arrangement makes the level of the signal-to-noise ratio sufficient for the fluorescent mark to be decoded and avoids any interaction from the blue illumination on the acquisition of the image in contrast by the second camera 6. The small angle of emission of the LEDs also makes it possible to position the LEDs at different distances from the object plane in order to improve the compactness of this lighting system.

In accordance with the invention, the second lighting system 9 is placed downstream from the screen 10 in the movement direction 2, and in the cavity of said screen 10. The second lighting system 9 is thus placed in the shadow of the screen 10 so as to eliminate the impact of the first lighting system 8 in this zone. Therefore, the amount of interference between the first and the second lighting systems is minimal. The performance during the acquisition by the respective cameras is improved, as is the reading of the respective marks.

For example, the second lighting system 9 is made up of a single strip of Surface Mount Component (SMC) LEDs disposed in the cavity of the concave screen at a distance lying in the range 11 mm to 16 mm from the object plane of the camera 6. In addition, the LEDs are pointed in such a manner as to form an angle of incidence lying in the range 35° to 55° relative to the optical axis of the camera 6. For example, for an angle of incidence of 45°, the strip of LEDs is situated at 13 mm from the object plane. This position guarantees a maximum level of illumination in the object plane with maximum compactness. The use of CMS LEDs makes it possible to achieve the level of illumination sufficient for acquisition of an image of a mark visible in contrast.

The light emitted by the second lighting system 9 belongs to the visible domain whose wavelengths lie in the range 400 nm to 750 nm. The lighting system 9 thus includes the excitation wavelength for exciting the fluorescent mark and the wavelength of the light emitted by the excited mark. Therefore, the upstream position of the first lighting system 8 results in remanent light being emitted by the surface of the mailpiece in motion through the second window 7 that does not adversely affect acquisition of the image in contrast by the camera 6. It can be understood that, if the second lighting system 9 and the second camera 6 had been placed upstream, the wavelengths emitted by the lighting system 9 would have resulted in remanent light on the mailpiece in motion that would disturb acquisition by the camera 4.

For example, a Charge-Coupled Device (CCD) linear camera 4 is chosen that is of the Time Delayed Integration (TDI) type with a 1024-pixel sensor having 96 rows and typical sensitivity of 1950 nanojoules per square centimeter (nJ/cm$^2$). The camera 4 is configured in such a manner as to acquire images of mailpieces with a resolution of 8 dots per millimeter. The camera 4 is dedicated to acquisition of an image of an excited fluorescent mark. To this end, it is equipped with a band-pass optical filter 14 centered on the emission wavelength of the excited mark, as explained in detail below. Similarly, a second CCD linear camera 6 is chosen that is of the TDI type having 64 rows with a 2048-pixel sensor and sensitivity lying in the range 196 nJ/cm$^2$ to 200 nJ/cm$^2$. The camera 6 is configured in such a manner as to acquire images of mailpieces with a resolution of 8 dots per millimeter. The sensitivity required by the camera 4 is adapted to fluorescent mark image acquisition and is greater than the sensitivity necessary for mark-in-contrast image acquisition by the multi-level gray scale camera 6.

The difference in sensitivity of the cameras requires a difference in window size and different focal lengths. The width of the window $W_{window}$ is determined as a function of the resolution used and of the number of rows "nbr_rows" of the camera. Provision is made to add 2 mm to compensate for any variations in positioning and 5 mm for the adhesive bonding whereby the window is bonded to the skid.

Thus, the width of a window is defined by:

$$W_{window} = \frac{\text{nbr\_rows}}{\text{resolution}} + 7$$

In this embodiment, the two windows are spaced apart by a distance of about 35 mm.

The focal length differences explain the offset positions of the cameras. Naturally the cameras 4 and 6 are pointed in a manner such that their optical axes are normal to the corresponding windows.

In operation, each mailpiece P is moved on edge past the window 5 and then past the window 7. The surface of the mailpiece is firstly illuminated by the system 8. In response to the incident excitation radiation 8, the light emitted by the fluorescent mark(s) is filtered by the band-pass optical filter, thereby avoiding disturbances due to the presence of other light radiation having different wavelengths inside the housing 3. The image of the fluorescent marks is then acquired through the first window 5 and is transmitted to a processing system (not shown) for decoding.

The surface of the mailpiece is then illuminated by the system 9 without disturbing the system 8, as explained above. In response to this illumination, the marks in contrast emit radiation for acquisition by the multi-level gray-scale camera 6. The image of the marks in visible contrast is acquired through the second window 7 and is transmitted to the processing system.

FIG. 3 shows the skid 12 in detail, with the two windows 5 and 7 between which an alternative opaque screen 20 is placed. The screen 20 is circularly arcuate in shape and performs the same function as the screen 10 having a V-shaped section. FIG. 3 shows that the second lighting system 9 is also disposed in the cavity of the screen 20.

It appears clearly that, with prior art acquisition apparatus, it is not possible to acquire images both of fluorescent marking and of marking visible in contrast when the two types of marking are disposed at the same height on the mailpiece being moved on edge.

The invention is not limited to the above-described embodiment. It is clear to the person skilled in the art that the acquisition apparatus of the invention is suitable for acquiring images of both types of marking regardless of their positions on the surface of the mailpiece. Naturally, the invention also extends to acquisition apparatus in which the details of the lighting system, the type of camera, and the size of the windows are modified.

The invention claimed is:

1. A postal sorting machine including an image acquisition apparatus for acquiring images of mailpieces moved on edge past said image acquisition apparatus in a certain conveying direction, the apparatus comprising:
    a housing provided with a skid against which surface the mailpieces slide in said conveying direction, and inside which the following are placed:
        a first camera for acquiring an image of the surface of a mailpiece through a first window formed in said skid;
        a first lighting system arranged to emit light radiation at a certain wavelength suitable for exciting a fluorescent mark;
        a second lighting system arranged to emit light radiation in the visible light domain; and
        means designed to prevent light interference between the first lighting system and the second lighting system;
    wherein said image acquisition apparatus further comprises:
        a second camera placed inside the housing and for forming an image of the surface of a mailpiece through a second window formed in said skid, the first and second windows being spaced apart along said conveying direction and disposed substantially perpendicularly to said conveying direction;
    said first camera co-operating with said first lighting system to acquire an image of the surface of a mailpiece through said first window, and said second camera co-operating with said second lighting system to acquire an image of the surface of a mailpiece through said second window, and wherein said means for preventing light interference comprises an opaque screen, concave in shape, and disposed between the first window and the second window, the second lighting system being disposed in the cavity of said screen.

2. A postal sorting machine according to claim 1, in which said opaque screen has a V-shaped section.

3. A postal sorting machine according to claim 1, in which said opaque screen has a circularly arcuate shape.

4. A postal sorting machine according to claim 1, in which a band-pass optical filter is placed between said first camera and said first window.

5. A postal sorting machine according to claim 1, in which the first lighting system comprises LEDs disposed on either side of the first window.

6. A postal sorting machine according to claim 1, in which the second lighting system is disposed on one side of the second window and comprises at least one LED.

7. A postal sorting machine according to claim 1, in which said first lighting system is disposed upstream from said second lighting system.

8. A postal sorting machine according to claim 7, in which the first and second windows are of elongate shape.

* * * * *